United States Patent [19]
Schmidt

[11] Patent Number: 5,832,844
[45] Date of Patent: Nov. 10, 1998

[54] SYSTEM FOR RECYCLING USED OIL FILTERS

[76] Inventor: Karl W. Schmidt, 3900 E. 68th Ave., Commerce City, Colo. 80022

[21] Appl. No.: 815,832

[22] Filed: Mar. 12, 1997

[51] Int. Cl.$^6$ ..................................................... A47J 36/24
[52] U.S. Cl. ........................... 110/236; 110/210; 110/211; 110/212; 110/215; 241/23; 241/24.1; 241/24.11; 241/24.13
[58] Field of Search ..................................... 110/346, 236, 110/210, 211, 212, 215; 241/23, 24.1, 24.11, 24.12, 24.13, 24.15

[56] References Cited

U.S. PATENT DOCUMENTS

| | | | |
|---|---|---|---|
| 4,706,893 | 11/1987 | Brock | 241/23 |
| 4,927,085 | 5/1990 | Oberg | 241/36 |
| 4,958,578 | 9/1990 | Houser | 110/246 |
| 5,135,176 | 8/1992 | Barber | 241/23 |
| 5,236,136 | 8/1993 | McCarty et al. | 241/24 |
| 5,299,348 | 4/1994 | Slack et al. | 29/403.3 |
| 5,366,165 | 11/1994 | Jackman | 241/29 |
| 5,401,293 | 3/1995 | Gardner | 75/403 |
| 5,406,691 | 4/1995 | Thorne | 29/564.3 |
| 5,433,390 | 7/1995 | Keeler et al. | 241/33 |
| 5,513,804 | 5/1996 | Keeler et al. | 241/16 |
| 5,584,255 | 12/1996 | Bishop et al. | 110/235 |

*Primary Examiner*—Henry Bennett
*Assistant Examiner*—Pamela A. Wilson
*Attorney, Agent, or Firm*—Dorr, Carson, Sloan & Birney, P.C.

[57] ABSTRACT

A recycling system processes used oil filters on a continuous basis by shredding the oil filters and then incinerating the shreds in a rotary kiln. The shreds are fed into the upper end of an inclined rotating drum kiln. The shreds of combustible material and any oil are burnt to produce exhaust gases and ash particles. The remaining metal shreds are discharged at the lower end of the rotating drum through a first port. The exhaust gases and ash particles flow from the kiln through a first cyclone which separates out any heavy unburnable pieces. The remaining exhaust gases and ash particles then pass through an afterburner to further ensure complete combustion and minimize air pollution. A second cyclone separates the ash particles from the exhaust gases. An exhauster can be used to induce the flow of exhaust gases and ash particles from the kiln through the afterburner and cyclones. This system automatically separates metal shreds and incinerates the combustible materials and oil in the oil filters. Ash particles are also automatically separated by the second cyclone and discharged through a separate port.

18 Claims, 8 Drawing Sheets

Fig. 6

SYSTEM FOR RECYCLING USED OIL FILTERS

BACKGROUND OF THE INVENTION

1. Field of the Invention

The present invention relates generally to the field of systems for recycling used oil filters. More specifically, the present invention discloses a recycling system that shreds used oil filters, incinerates the combustible components, and automatically separates ash from the metal shreds.

2. Statement of the Problem

Used oil filters present a unique challenge for disposal and recycling due to the variety of materials found in most oil filters. In addition, used oil filters typically contain at least a small quantity of used motor oil, which further complicates matters. Many used oil filters are simply discarded in landfills. However, this practice can have adverse environmental consequences, particularly if oil drains from the filters and diffuses into the surrounding geological formations and groundwater.

Several devices have been invented in the past to crush or flatten used oil filters. This makes used oil filters more compact, and therefore easier to transport. However, it does little to address the overall problem of how to recycle or properly dispose of these filters.

Several past inventors have attempted to address the problem by creating systems to disassemble or cut open oil filters so that their components can be taken apart and separated by material type for recycling or disposal. These systems tend to be very complex and would require extensive manual labor to separate the oil filter components into the necessary categories. Furthermore, oil filters come in a very wide range of dimensions, configurations, and component materials. This makes it virtually impossible for any one recycling system to process more than a small fraction of the available oil filters. Given the present market prices for recycled materials, such systems are not economically viable.

Efforts have also been made in the past to incinerate used oil filters. The relatively large size and mass of most oil filters makes thorough incineration difficult. In addition, the oil in the filters tends to vaporize and produce hydrocarbon emissions.

The prior art in the field includes the following:

| Inventor | Patent No. | Issue Date |
|---|---|---|
| Brock | 4,706,893 | Nov. 17, 1987 |
| Oberg | 4,927,085 | May 22, 1990 |
| Barber | 5,135,176 | Aug. 4, 1992 |
| McCarty et al. | 5,236,136 | Aug. 17, 1993 |
| Slack et al. | 5,299,348 | April 5, 1994 |
| Thorne | 5,406,691 | April 18, 1995 |
| Jackman | 5,366,165 | Nov. 22, 1994 |
| Gardner | 5,401,293 | Mar. 28, 1995 |
| Keeler et al. | 5,433,390 | July 18, 1995 |
| Keeler et al. | 5,513,804 | May 7, 1996 |

Barber discloses a recycling system in which used oil filters are shredded and then heated in a thermal unit 39. The thermal unit is described as a "heater or oven" that converts the "porous media particles" into ash. A magnet 46 is used to separate the metal particles from the ash. This system would require substantial labor to load and unload the thermal unit for each batch, and to provide magnetic separation.

McCarty et al. disclose another example of a recycling system in which used oil filters are shredded and then subjected to magnetic separation. This system does not heat or burn the non-metal components of the oil filters.

Thorne and Slack et al. are examples of recycling systems in which a series of used oil filters are individually processed to separate the baseplate from the canister and remove the filter media.

Oberg discloses a crusher for collapsing oil filter casings while capturing any remaining oil.

Brock discloses a system for recycling asphalt roofing shingles. The shingles are ground into particles, mixed with liquid asphalt, and heated to form a paving composition.

Jackman shows a recycling system in which oil filters are shredded, pass through a magnetic separator, and are then sprayed with heated, pressurized water. Similarly, the two patents of Keeler et al. disclose a recycling system in which oil filters are shredded, sprayed with hot water, and then dried in a spinning drum 12.

Gardner discloses a recycling system in which used oil filters are heated in a primary chamber 40 to a temperature of 250° to 400° C. to carbonize any hydrocarbons remaining in the filters. Hydrocarbon vapors and water vapor from the primary chamber 40 are condensed in a condenser 50, and any remaining hydrocarbons are incinerated in a secondary chamber 68.

3. Solution to the Problem

None of the prior art references uncovered in the search show a recycling system for used oil filters that employs the combination of a shredder, rotary kiln, and cyclone to continuously shred and incinerate used oil filters, and automatically separate metal components from the resulting ash.

SUMMARY OF THE INVENTION

This invention provides a recycling system that processes used oil filters on a continuous basis by shredding the oil filters and then incinerates the shreds in a rotary kiln. The shreds are fed into the upper end of an inclined rotating drum kiln. The shreds of combustible material and any oil are burnt to produce exhaust gases and ash particles. The remaining metal shreds are discharged at the lower end of the rotating drum through a first port. The exhaust gases and ash particles flow from the kiln through a first cyclone which separates out any heavy unburnable pieces. The remaining exhaust gases and ash particles then pass through an afterburner to further ensure complete combustion and minimize air pollution. A second cyclone separates the ash particles from the exhaust gases. An exhauster can be used to induce the flow of exhaust gases and ash particles from the kiln through the afterburner and cyclones. This system automatically separates metal shreds and incinerates the combustible materials and oil in the oil filters. Ash particles are also automatically separated by the second cyclone and discharged through a separate port.

A primary object of the present invention is to provide a recycling system that can process used oil filters on a continuous basis.

Another object of the present invention is to provide a recycling system that automatically separates metal and fly ash resulting from incineration of used oil filters into separate process streams for recycling.

Another object of the present invention is to provide a recycling system that can economically process a large number of used oil filters with minimum labor.

Yet another object of the present invention is to provide a recycling system for used oil filters that minimizes air pollution resulting from incineration of used oil filters.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
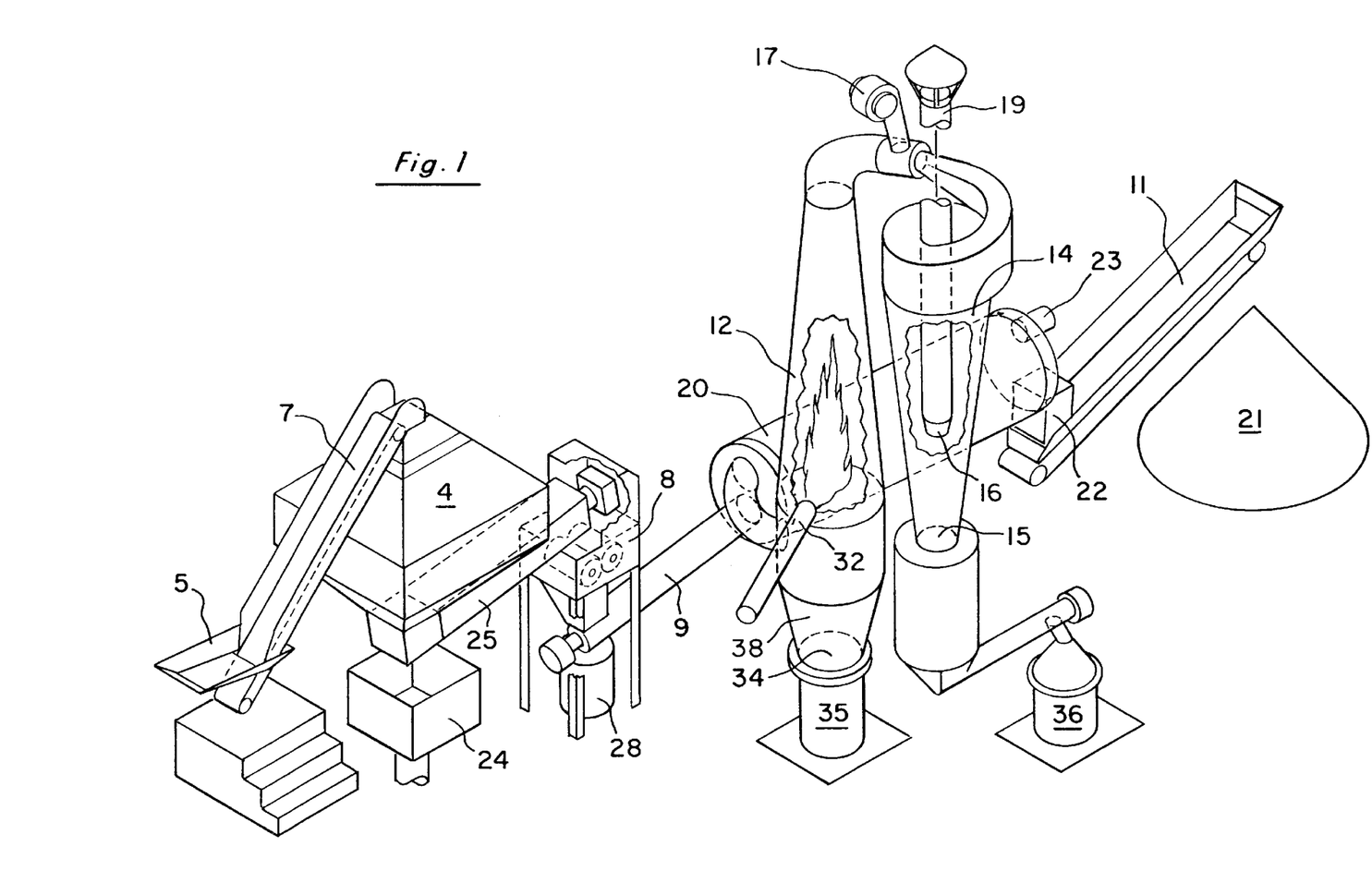
FIG. 1 is a front perspective view of the entire system.

FIG. 1 provides a general overview of the present invention. Used oil filters are initially unloaded onto a sorting table 5 for visual inspection and any extraneous objects are manually removed. Used oil filters usually contain a small quantity of motor oil. During the course of unloading and handling, many of the oil filters are tipped and release oil. The sorting table 5 is equipped with a sump that catches and collects any oil draining from the oil filters. A pump automatically drains the oil from the sump into a tank or drums whenever the oil level in the sump exceeds a predetermined level. The oil that collects in the sump 6 can be shipped to a refinery for recycling, or it can be used to fire the kiln 10 or afterburner 12, as will be described below.

Figure 2A:
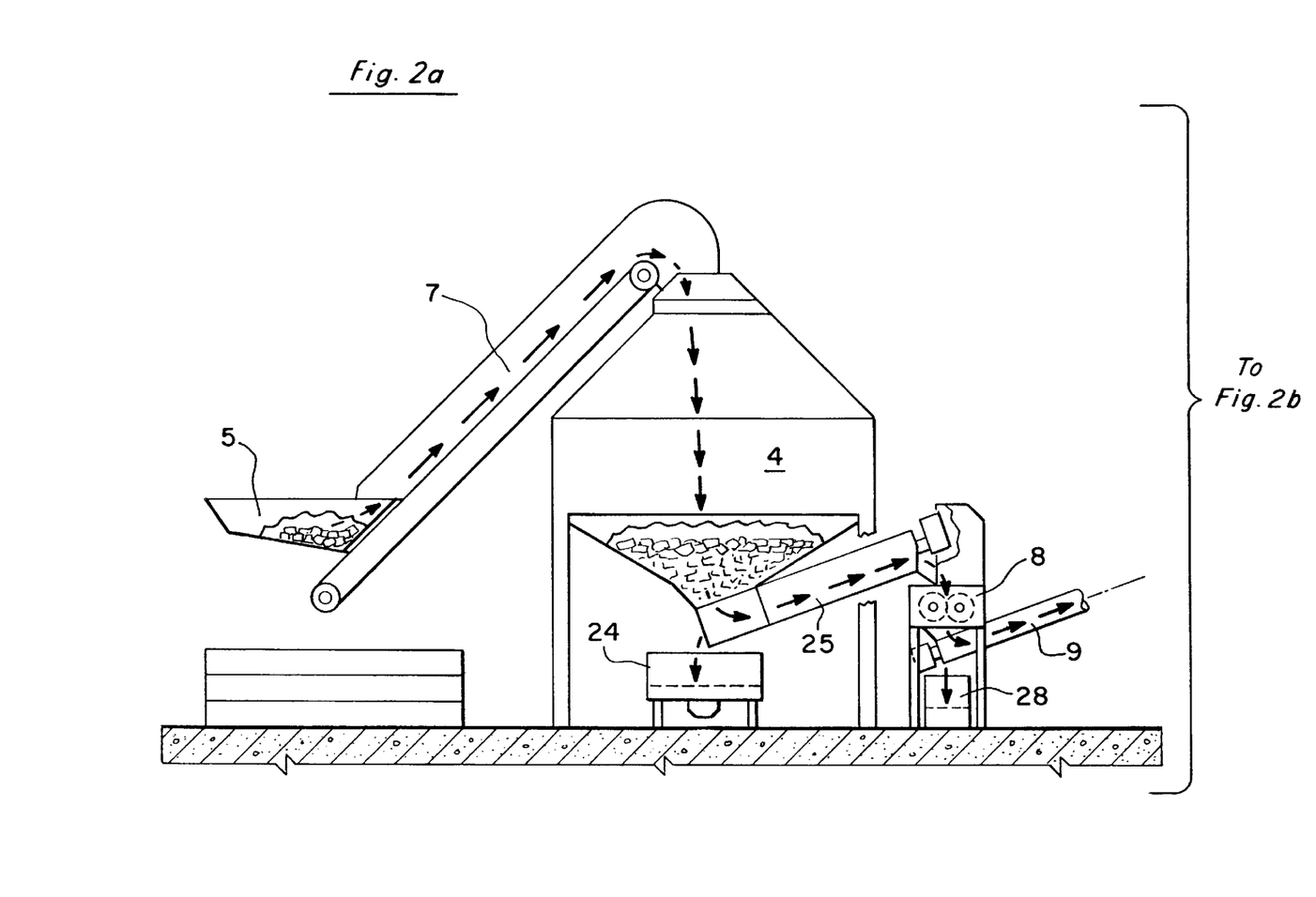
FIG. 2(a) is a side cross-sectional view of the sorting table 5, storage bin 4, and shredder 8.
Figure 3A:
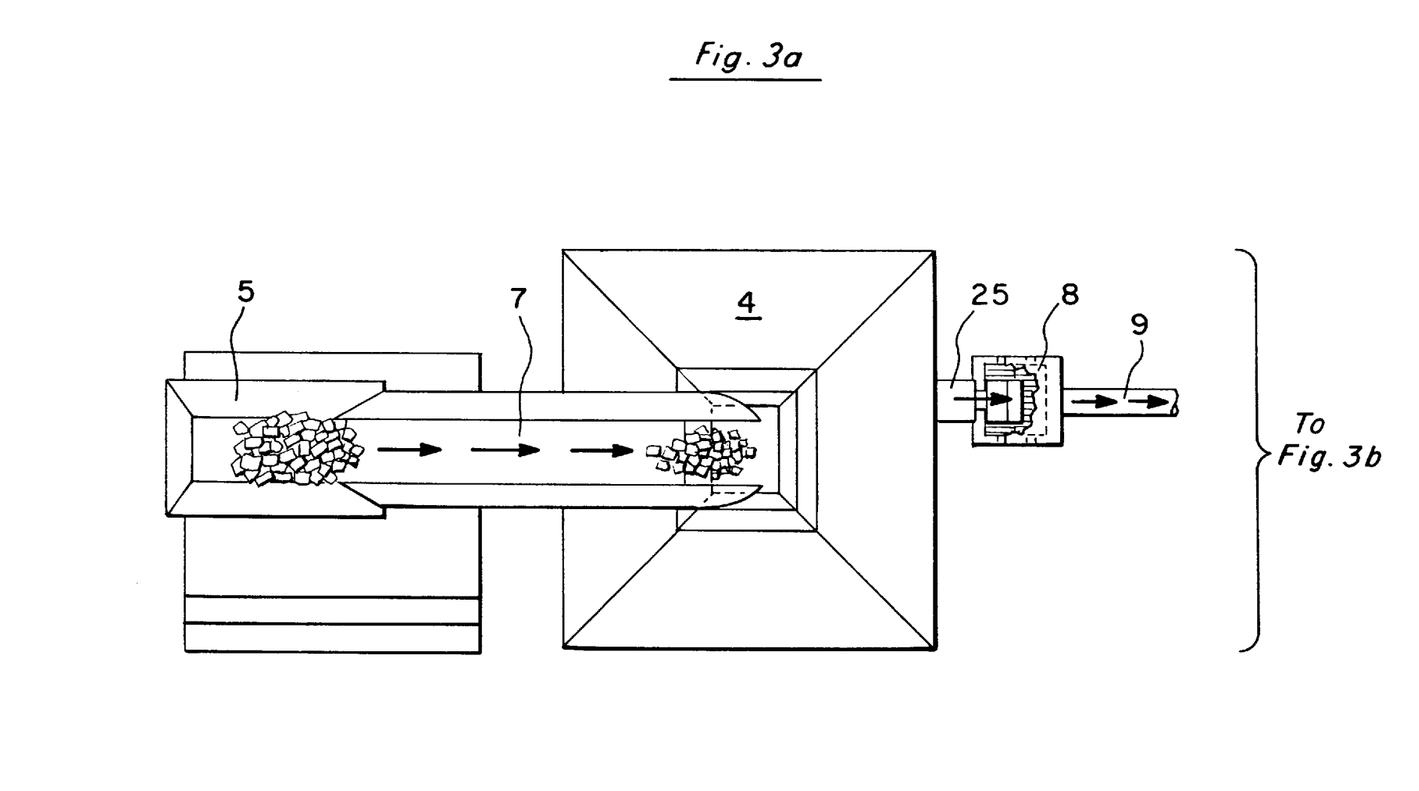
FIG. 3(a) is a top plan view the sorting table 5, storage bin 4, and shredder 8 corresponding to FIG. 2(a).

As shown in FIGS. 2(a) and 3(a), the oil filters are fed from the sorting table 5 via an inclined conveyor 7 into a storage bin 4. A drain pan beneath the conveyor 7 catches any oil draining from the oil filters on the conveyor 7. The incline of the conveyor causes the oil to drain into the sump by gravity.

The storage bin 4 is used to store the oil filters for later processing. It is also equipped with a sump 24 that collects any oil draining from the filters in the storage bin 4. A conveyor 25 carries filters released from the storage bin 4 to a shredder 8.

The shredder 8 shreds the oil filters into small pieces of metal, rubber, and filter material. Any remaining oil in the filters tends to coat the resulting shreds. Surplus oil collects in a sump 28 below the shredder 8. The filter material is typically paper or a fibrous material that is largely combustible. The shreds and oil are carried by a feeder screw 9 into a kiln 10. The feeder screw 9 is enclosed in a casing so that all of the entrained oil is carried into the kiln with the shreds. The advancing shreds continually form a loose plug in the casing at the distal end of the feeder screw 9. This helps to prevent fire from spreading upstream from the kiln along the feeder screw 9.

Figure 2B:
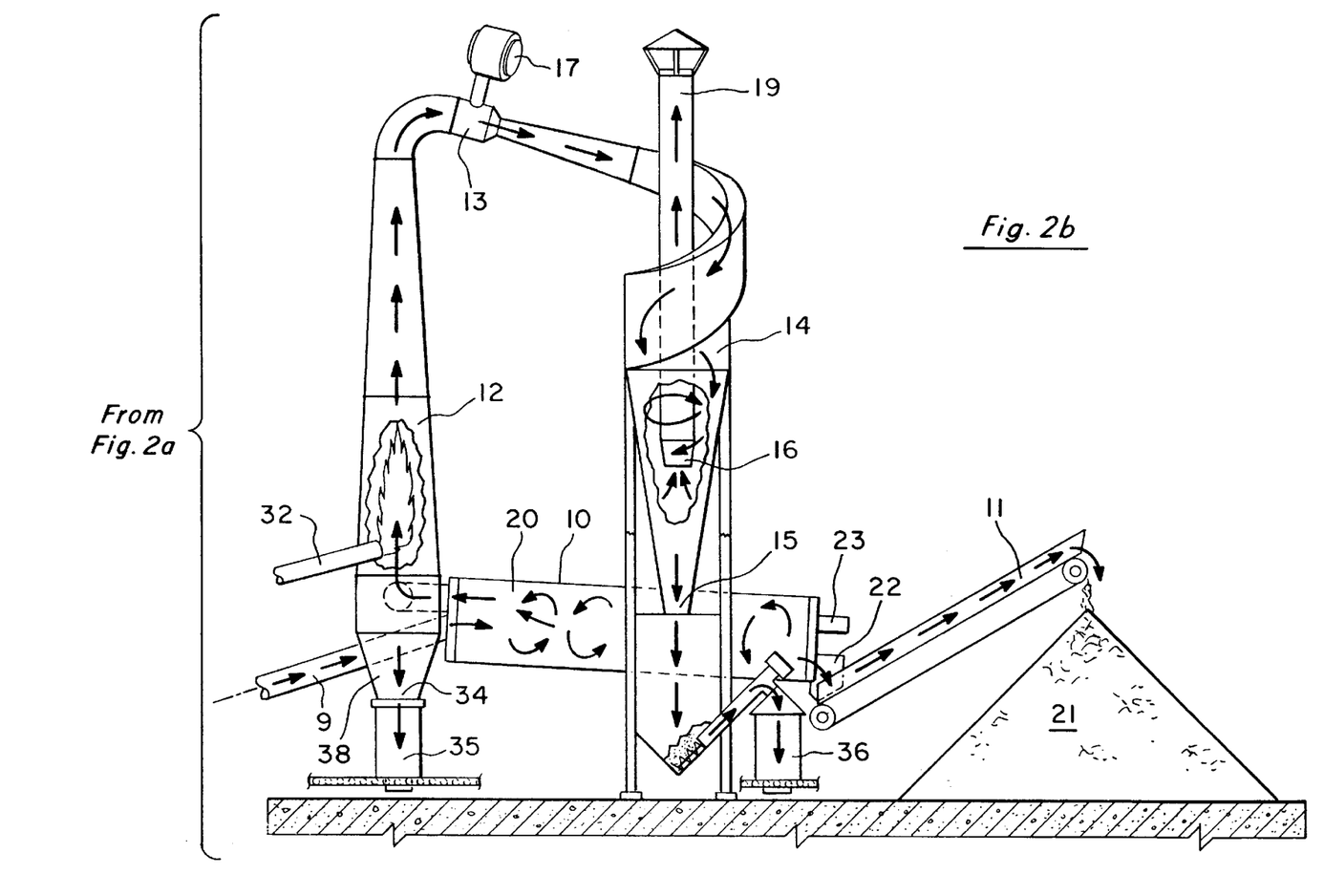
FIG. 2(b) is a side cross-sectional view of the rotary kiln 10, afterburner 12, and cyclones 38 and 14.

In the preferred embodiment of the present invention, the kiln 10 consists of an inclined rotating drum 20 which is lined with refractory material. The upper end of the rotating drum 20 receives the shreds and oil from the feeder screw 9. The kiln 10 is heated by natural gas or oil burners 23 to a point well above the combustion temperature of the rubber, filter material, and oil contained in the shreds. Ample air is drawn into the kiln 10 so that virtually all of the rubber, filter material, and oil is burnt off. Gravity and the agitation resulting from rotation of the drum gradually move the shreds downward along the length of the drum 20. The shreds of rubber and filter material are oxidized to produce exhaust gases and particles of ash. Any oil carried by the shreds is also oxidized and serves to fuel combustion within the kiln 10. The flow of air and exhaust gases through the kiln 10 entrains most of the ash particles created by the combustion process and any light non-combustible materials, so that the material remaining at the lower end of the rotating drum 20 consists mainly of metal shreds.

The metal shreds are discharged from the kiln 10 through a port 22 beneath the lower end of the rotating drum 20. A take-away conveyor 11 carries the metal shreds to a cooling pile 21 as shown in FIG. 2(b). After the metal shreds have cooled, they can be readily sold as steel scrap.

The exhaust gases, ash particles, and shreds of any light material are drawn from the kiln 10 into a first cyclone 38 as illustrated in FIG. 2(b). Due to the high temperatures involved, the first cyclone is funnel shaped and is lined with refractory material. Some of the ash particles and virtually all of the shreds of non-combustible light materials precipitate out and collect at the lower port 34 of the first cyclone 38. A drum filling station 35 allows the materials to be loaded into drums or containers for recycling or disposal.

The remaining exhaust gases and ash particles are drawn from the first cyclone 38 into an afterburner 12. The afterburner 12 is lined with refractory material. An oil or natural gas burner 32 is installed tangentially near the bottom of the afterburner chamber 12 to promote a spiraling upward flow to help ensure complete combustion of the exhaust gases, and ash particles. The afterburner 12 also draws in excess air to dilute the exhaust gases.

Returning to FIGS. 2(b) and 3(b), the exhaust gases and ash are drawn from the afterburner 12 by a draft inducer or exhauster 13, and pass into a cyclone 14. The exhauster 13 is a venturi powered by pressurized air supplied by a blower 17 or air compressor that creates a region of reduced pressure at the top of the afterburner 12. The air from the blower 17 also helps to cool and dilute the exhaust gases. In the preferred embodiment, the exhauster injects additional air in the exhaust stream at a ratio of about 4:1.

Figure 3B:
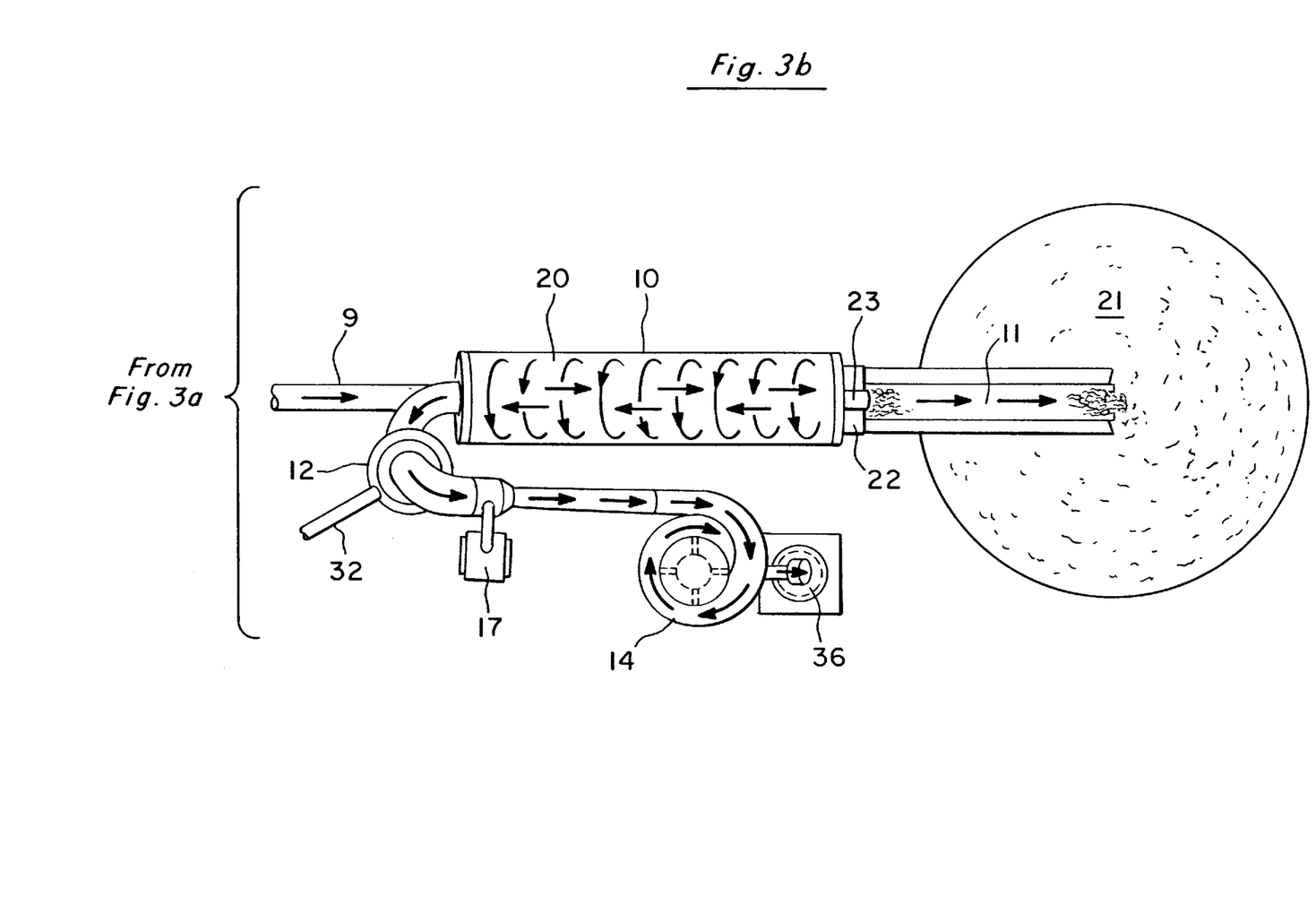
FIG. 3(b) is a top plan view of the rotary kiln 10 and cyclones corresponding to FIG. 2(b).

The cyclone 14 is funnel-shaped with a tangential entry port near the top of the funnel. The shape of the second cyclone 14 induces a spiral flow, as illustrated in FIG. 3b, which causes denser matter, such as ash particles, to migrate radially outward in the flow. The ash particles collect along the wall of the second cyclone 14 and then fall downward to the lower port 15. The cleaned exhaust gases spiral downward within the second cyclone 14 and then spiral upward to exit through the upper port 16 leading to an exhaust stack 19. The ash collects at the lower port 15 of the second cyclone 14, where it is discharging through a drum filling station 36 into barrels or containers for transportation. The ash can be recycled as light weight aggregate for making concrete, tiles, cinder blocks, etc.

Figure 4:
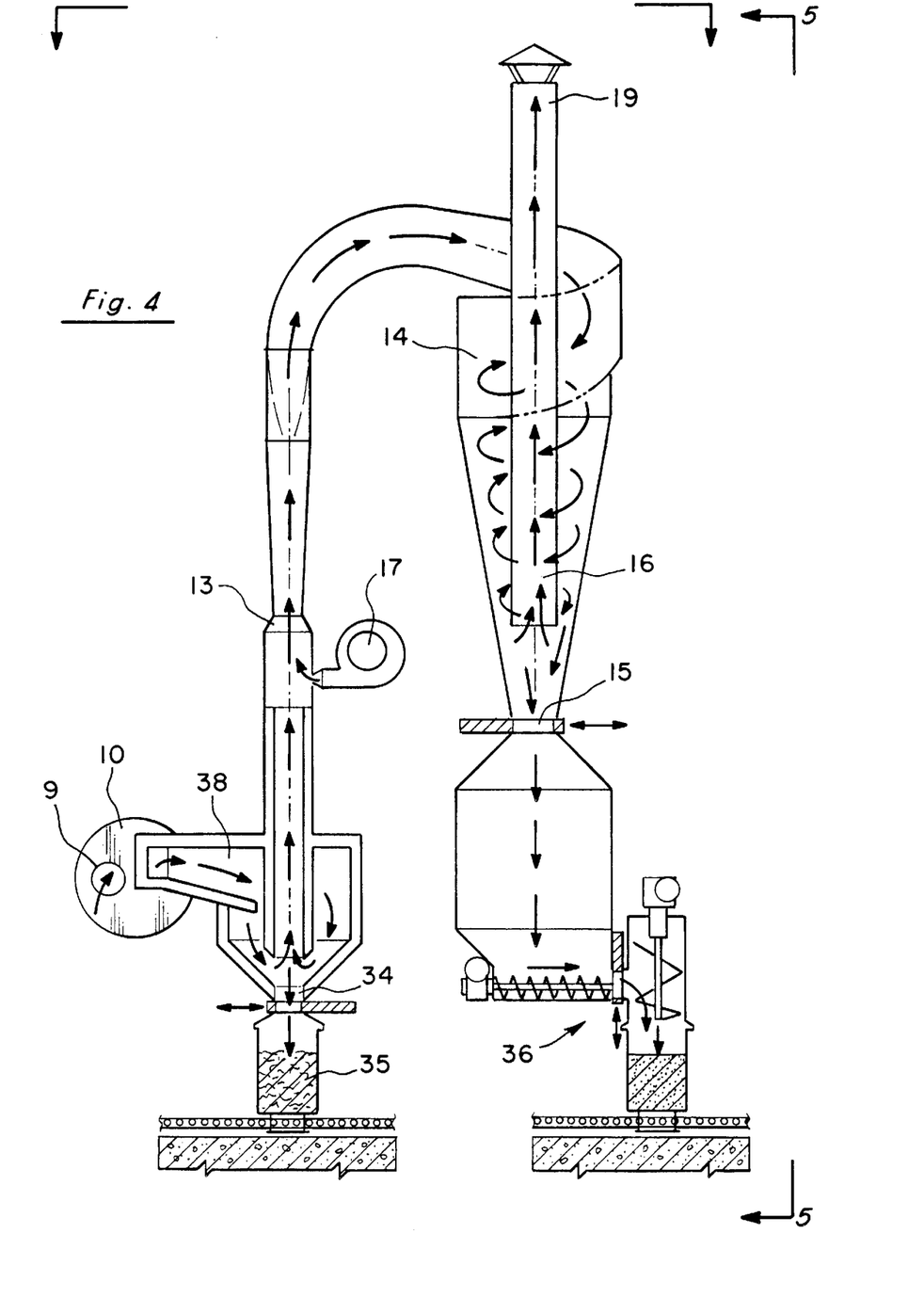
FIG. 4 is a side cross-sectional view of an alternative embodiment of present invention showing the rotary kiln 10, cyclones 38 and 14, and the exhauster 13.
Figure 5:
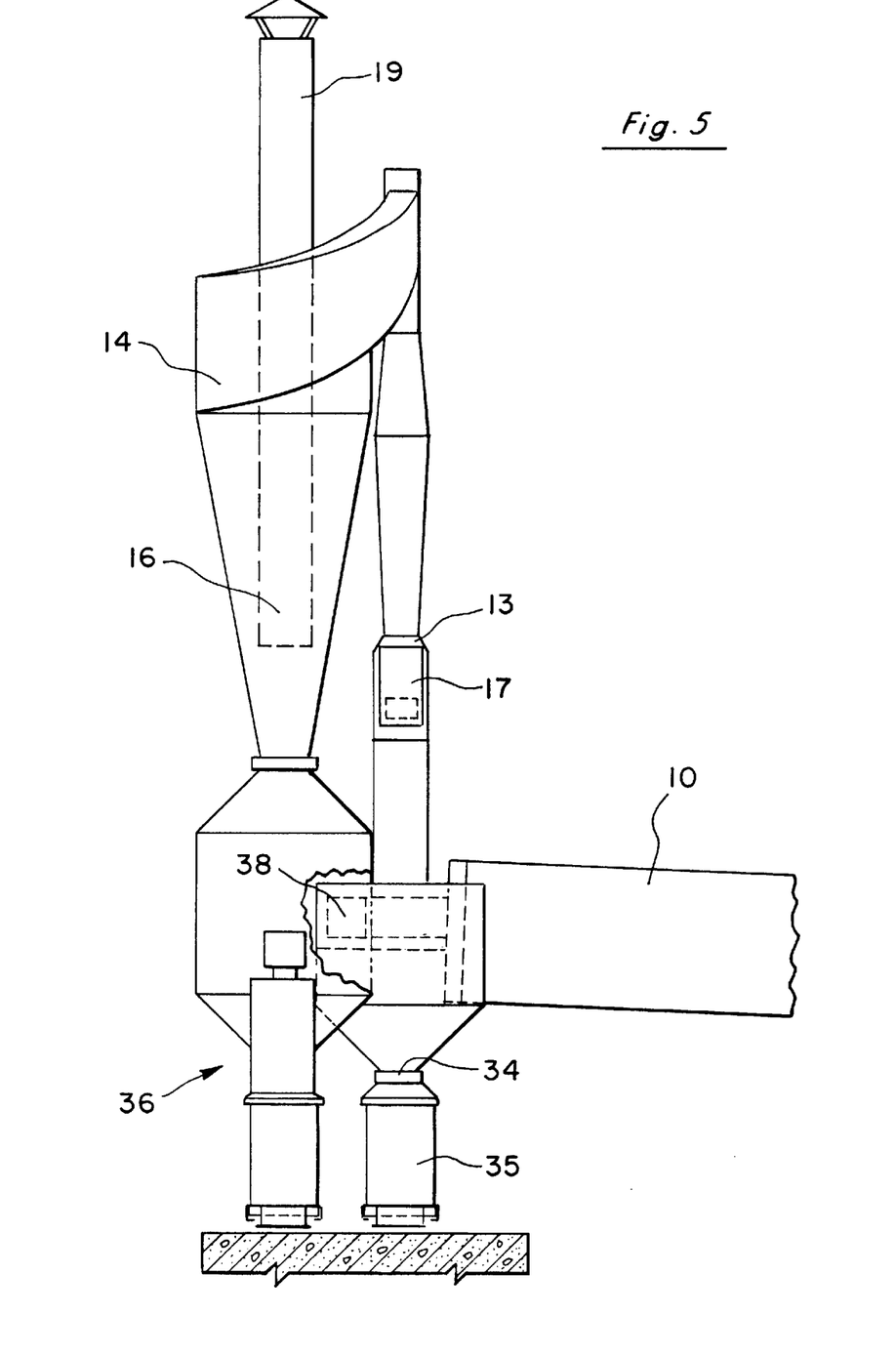
FIG. 5 is another side view of the alternative embodiment corresponding to FIG. 4.
Figure 6:
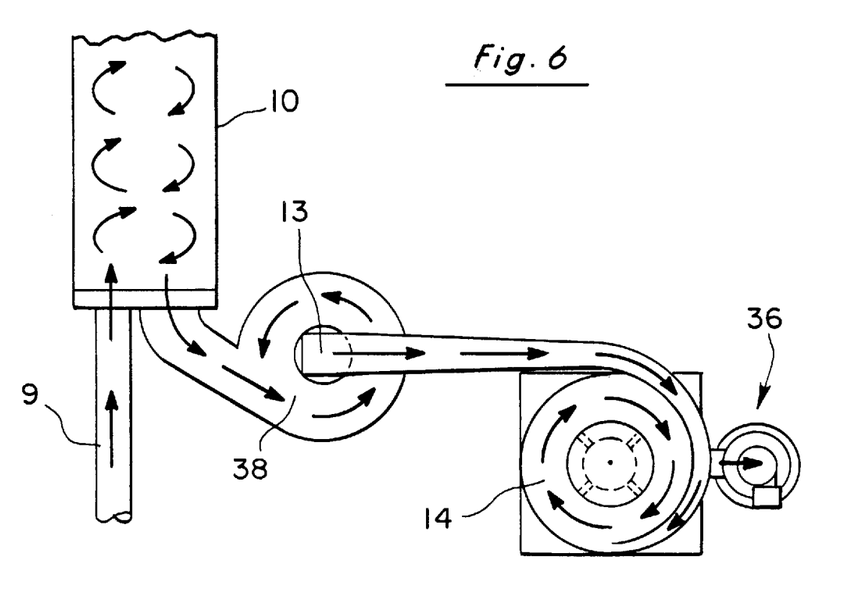
FIG. 6 is a top view corresponding to FIGS. 4 and 5.

FIGS. 4 through 6 show an alternative embodiment of the present invention in which the afterburner has been omitted. The afterburner adds cost and complexity to the system, and may not be necessary depending on the combustion efficiency of the kiln 10 and the local air pollution restrictions.

In this embodiment, exhaust gases and ash pass directly from the first cyclone 38 through the exhauster 13 and into the second cyclone 14. A scrubber, electrostatic precipitator, or bag-type dust collector could be installed in the exhaust stack 19 of the second cyclone 14 to reduce air pollution. This embodiment also includes a more sophisticated drum filling station 36 for loading ash into barrels or containers for shipment. A gate at the lower port 15 of the second cyclone 14 allows ash to fall into a collection bin. When sufficient ash has accumulated in the collection bin, a screw conveyor removes the ash to an external drum. This ash is typically very fine and does not pack in a container to a high degree of density. The embodiment shown in FIGS. 4 through 6 includes a screw packer that compresses the ash as it loaded into the drum.

The above disclosure sets forth a number of embodiments of the present invention. Other arrangements or embodiments, not precisely set forth, could be practiced under the teachings of the present invention and as set forth in the following claims.

I claim:

1. A system for recycling used oil filters comprising:
   a shredder for shredding used oil filters into shreds of metal and combustible materials and entrained oil;
   a kiln for combustion of said shreds of metal and combustible materials fueled at least in part by said entrained oil and combustible materials, and having means for separating said metal shreds from the exhaust gases and entrained ash particles produced by said kiln; and
   a cyclone for receiving exhaust gases and entrained ash particles from said kiln and precipitating said ash particles.

2. The system of claim 1 wherein said kiln further comprises a rotary kiln.

3. The system of claim 1 wherein said kiln further comprises an inclined rotating drum having an upper end for receiving said shreds of metal and combustible materials from said shredder, and a lower end for discharging shreds of metal remaining after combustion.

4. The system of claim 1 further comprising an afterburner for further combustion of said exhaust gases and ash particles produced by said kiln.

5. The system of claim 1 further comprising an additional cyclone after said first cyclone for precipitating heavier materials entrained in said exhaust gases.

6. The system of claim 1 further comprising a sorting table for visual inspection of oil filters before entering said shredder.

7. The system of claim 1 further comprising an additional cyclone after said first cyclone for precipitating heavier materials entrained in said exhaust gases.

8. The system of claim 1 further comprising an exhauster for inducing a flow of said exhaust gases and ash particles from said kiln through said cyclone.

9. The system of claim 1 further comprising a feed screw for conveying said shreds and any entrained oil from said shredder to said kiln.

10. A system for recycling used oil filters comprising:
    a shredder for shredding used oil filters into shreds of metal and combustible materials and entrained oil;
    a kiln for combustion of said shreds fueled at least in part by said entrained oil, said kiln having an inclined rotating drum having an upper end for receiving said shreds and entrained oil from said shredder and a lower end for discharging metal shreds remaining after combustion;
    a first cyclone receiving exhaust gases and entrained material produced by said combustion in said kiln and precipitating heavier ash particles;
    a second cyclone receiving exhaust gases and entrained ash particles from said first cyclone and precipitating any remaining ash particles; and
    a exhauster for inducing a flow of said exhaust gases and entrained material from said kiln through said first and second cyclones.

11. The system of claim 10 further comprising an afterburner for further combustion of said exhaust gases and entrained materials produced by said kiln.

12. The system of claim 10 further comprising a sorting table for visual inspection of oil filters before entering said shredder.

13. The system of claim 12 wherein said sorting table further comprises:
    a sump for collecting and storing oil draining from the oil filters; and
    a pump for removing oil from said sump for disposal.

14. The system of claim 10 further comprising a feed screw for conveying said shreds and any entrained oil from said shredder to said kiln.

15. A system for recycling used oil filters comprising:
    a shredder for shredding the used oil filters into shreds of metal and combustible materials and entrained oil;
    a kiln for combustion of said shreds fueled at least in part by said entrained combustible materials and said entrained oil, said kiln having an inclined rotating drum having an upper end for receiving said shreds from said shredder, and a lower end for discharging metal shreds remaining after combustion;
    a cyclone after said kiln for precipitating heavier entrained materials;
    an afterburner for receiving exhaust gases and entrained material produced by said combustion in said kiln and providing further combustion of said exhaust gases and entrained materials;
    an additional cyclone receiving said exhaust gases and said ash particles from said afterburner and precipitating ash particles; and
    an exhauster for inducing a flow of said exhaust gases and ash particles from said kiln through said afterburner and said cyclone.

16. The system of claim 15 further comprising a sorting table for visual inspection of oil filters before entering said shredder.

17. The system of claim 16 wherein said sorting table further comprises:
    a sump for collecting and storing oil draining from the oil filters; and
    a pump for removing oil from said sump for disposal.

18. The system of claim 15 further comprising a feed screw for conveying said shreds and any entrained oil from said shredder to said kiln.

* * * * *